(12) United States Patent
Trigui et al.

(10) Patent No.: US 8,311,582 B2
(45) Date of Patent: Nov. 13, 2012

(54) ASYMMETRICAL BEAMS FOR SPECTRUM EFFICIENCY

(75) Inventors: Hafedh Trigui, Ottawa (CA); Stuart J. Dean, Kemptville (CA); John Litva, Almonte (CA)

(73) Assignee: TenXc Wireless Inc., Ottawa, Ontario (CA)

( * ) Notice: Subject to any disclaimer, the term of this patent is extended or adjusted under 35 U.S.C. 154(b) by 127 days.

(21) Appl. No.: 12/094,299

(22) PCT Filed: Mar. 19, 2007

(86) PCT No.: PCT/CA2007/000434
§ 371 (c)(1),
(2), (4) Date: Nov. 18, 2008

(87) PCT Pub. No.: WO2007/106989
PCT Pub. Date: Sep. 27, 2007

(65) Prior Publication Data
US 2009/0163214 A1    Jun. 25, 2009

(30) Foreign Application Priority Data
Mar. 17, 2006    (CA) .................................... 2540218

(51) Int. Cl.
*H04M 1/00*    (2006.01)
(52) U.S. Cl. ...................... 455/562.1; 342/373; 342/374
(58) Field of Classification Search ............... 455/562.1; 342/373, 374
See application file for complete search history.

(56) References Cited

U.S. PATENT DOCUMENTS

| | | | |
|---|---|---|---|
| 4,553,146 A | 11/1985 | Butler | |
| 5,241,321 A | 8/1993 | Tsao | |
| 5,581,260 A * | 12/1996 | Newman | 342/374 |
| 5,666,655 A * | 9/1997 | Ishikawa et al. | 455/512 |
| 5,686,926 A | 11/1997 | Kijima et al. | |
| 5,933,787 A * | 8/1999 | Gilhousen et al. | 455/438 |
| 6,018,663 A | 1/2000 | Karlsson et al. | |

(Continued)

FOREIGN PATENT DOCUMENTS

WO    9525409    9/1995

(Continued)

OTHER PUBLICATIONS

Wireless Solution Boosts Network Capacity, Hardware News, Mar. 1, 2006.*

(Continued)

*Primary Examiner* — George Eng
*Assistant Examiner* — Jing Gao
(74) *Attorney, Agent, or Firm* — Scully, Scott, Murphy & Presser, PC

(57) ABSTRACT

A method and apparatus for increasing capacity and performance of a base station for a sectorized cellular wireless network is disclosed in which one of the sector antennas is replaced or supplanted by a novel sub-sector antenna that generates a plurality of asymmetrical sub-sector coverage areas that collectively substantially cover the coverage area of the replaced sector antenna. The use of asymmetrical coverage areas permits the total coverage area to closely approximate the symmetrical sector coverage area without creating excessively large sub-sector handover zones or introducing severe degradation in the network performance. This in turn permits the selective replacement of a single sector antenna rather than the wholesale replacement of all sector antennas in a region, leading to lower transitional costs and the ability to provide a focused approach to capacity planning.

28 Claims, 10 Drawing Sheets

U.S. PATENT DOCUMENTS

| | | | |
|---|---|---|---|
| 6,067,053 | A | 5/2000 | Runyon et al. |
| 6,081,233 | A | 6/2000 | Johannisson |
| 6,087,989 | A | 7/2000 | Song |
| 6,094,165 | A * | 7/2000 | Smith .......................... 342/373 |
| 6,127,972 | A | 10/2000 | Avidor et al. |
| 6,297,774 | B1 | 10/2001 | Chung |
| 6,480,524 | B1 | 11/2002 | Smith et al. |
| 6,480,718 | B1 | 11/2002 | Tse |
| 6,608,591 | B2 | 8/2003 | Wastberg |
| 7,038,621 | B2 | 5/2006 | Gabriel et al. |
| 2003/0011522 | A1 | 1/2003 | McKinzie et al. |
| 2004/0196800 | A1* | 10/2004 | Padovani et al. .............. 370/321 |
| 2004/0217916 | A1 | 11/2004 | Quintero et al. |
| 2004/0246891 | A1* | 12/2004 | Kay et al. ...................... 370/215 |
| 2005/0101352 | A1 | 5/2005 | Logothetis et al. |

FOREIGN PATENT DOCUMENTS

| | | |
|---|---|---|
| WO | WO 9525409 * | 9/1995 |
| WO | WO 9525409 A1 | 11/1995 |
| WO | 0215326 | 2/2002 |
| WO | WO 2005/041353 A1 | 5/2005 |
| WO | 2006004463 | 1/2006 |
| WO | WO 2006/004463 A1 | 1/2006 |
| WO | WO 2006004463 A1 * | 1/2006 |

OTHER PUBLICATIONS

English language translation of Chinese Official Action mailed Mar. 30, 2011 in corresponding Chinese Patent Application No. 200780001609.9.

Supplementary European Search Report mailed Mar. 16, 2011 in corresponding European Patent Application No. 07710762.

Wireless Solution Boosts Network Capacity, Hardware News, Mar. 1, 2006, http://mobiledevdesign.com/hardware_news/radio_wireless_solution_boosts/;.

Reverse Link Performance Study of Wireless Local Loop and Mobile Cellular CDMA Systems, Proceedings of the 23rd National Radio Science Conference (NRSC 2006), Mar. 14-16, 2006, pp. 1-17.

The Design of Narrow Beamwidth Asymmetric Sidelobe Array Antenna Patterns Using Analytic Signal Concept, IEEE Transactions on Antennas and Propagation, Oct. 1, 1991, pp. 1530-1532, vol. 39, No. 10.

European Search Report mailed Mar. 16, 2011 in corresponding European Patent Application No. 07710762.

English language translation of Egyptian Official Action mailed Sep. 16, 2008 in corresponding Egyptian Patent Application No. 2008091537.

Egyptian Official Action mailed Feb. 13, 2011 in corresponding Egyptian Patent Application No. 2008091537, together with English language translation.

Indonesian Official Action mailed Apr. 23, 2010 in corresponding Indonesian Patent Application No. W00200803339, together with English language translation.

English language translation of Indian Official Action mailed Dec. 3, 2008 in corresponding Indian Patent Application No. 1683/MUMNP/2008.

English language translation of Indian Official Action mailed Aug. 18, 2009 in corresponding Indian Patent Application No. 1683/MUMNP/2008.

Elliott, Design of Line Source Antennas for Narrow Beamwidth and Asymmetric Low Sidelobes, IEEE Transactions on Antennas and Propagation, 1975.

Trucco, Synthesizing Asymmetric Beam Patterns, IEEE Journal of Oceanic Engineering, 2000.

Thornton, A Low Sidelobe Asymmetric Beam Antenna for High Altitude Platform Communications, IEEE Microwave and Wireless Components Letters, vol. 14, No. 2, 2004.

Ramakoteswara Rao et al., Design and Development of Asymmetric Beam Monopulse Antenna System at Ka-Band, APMC2005 Proceedings, 2005.

Excerpts from Bidgoli, Hossein (Ed), The Internet Encyclopedia, vol. 3, John Wiley & Sons, 2004.

Webpage returned by Google in response to search for the term "asymmetric beam antenna", Nov. 10, 2010.

Ebine et al., A Dual Beam Base Station Antenna for Land Mobile Communications, Proceedings of the 9th IEE International Conference on Antennas and Propagations, Apr. 4-7, 1995, pp. 340-343, Conference Publication No. 407, IEE, London.

Allen, A Theoretical Limitation on the Formation of Lossless Multiple Beams in Linear Arrays, IRE Transactions on Antennas and Propagation, Jul. 1961, pp. 350-352.

Hall et al., Review of Radio Frequency Beamforming Techniques for Scanned and Multiple Beam Antennas, IEEE Proceedings, Oct. 1990, vol. 137, Part H, No. 5.

Osseiran et al., System Performance of Transmit Diversity Methods and a Two Fixed-Beam System in WCDMA, Wireless Personal Communications 31: 33-50, 2004, Kluwer Academic Publishers.

Saunders, relevant page from the book Antennas & Propagation for Wireless Communication Systems, 1999, John Wiley & Sons Ltd., ISBN 0-471-98609-7.

Wacker et al., The Impact of the Base Station Sectorisation on WCDMA Radio Network Performance, Proceeding of the IEEE Vehicular Communications Technology Conference, VTC 1999, Houston, Texas, May 1999, pp. 2611-2615.

Notice of Allowance dated Mar. 30, 2012 received from the Chinese Patent Office in related application 200780001609.9 together with an English language translation.

* cited by examiner

ASYMMETRICAL BEAMS FOR SPECTRUM EFFICIENCY

FIELD OF THE INVENTION

The present invention relates to network planning and in particular to improved sector capacity and throughput in an established network without creating coverage holes.

BACKGROUND TO THE INVENTION

In wireless communications systems, there are a number of technical limitations. A first limitation is that the frequency spectrum is a scarce resource, which should be efficiently used. For a finite amount of spectrum, there is an upper bound on the number of subscribers that could be simultaneously served. To increase the number of subscribers, multiple access techniques have been introduced in the past.

The most common are: Frequency Division Multiple Access (FDMA), wherein only a small portion of the available spectrum is allocated to a subscriber; Time Division Multiple Access (TDMA), wherein a subscriber is not allowed to transmit continuously, but instead, the subscriber is only allowed to transmit during short non-overlapping periods of time called bursts; and Code Division Multiple Access (CDMA), wherein the total spectrum is allocated to all of the subscribers, who are differentiated by the use of allocated orthogonal codes.

Such and other multiple access techniques are combined in existing wireless systems to maximize the number of subscribers for a finite amount of resources (time, frequency, code, etc.).

Another limitation of wireless communications systems is the finite transmission power that results from overcoming implementation and propagation losses between a transmitter and a receiver. As a result, practical systems have only a finite communication range.

To overcome these two limitations, the cellular concept has been introduced for wireless systems. To cover a large area, the available resources are used for a small coverage area, called a cell, and repeated for other cells. The expected number of subscribers that can be served by a network will increase in proportion to the number of cells in the network.

However, because cells are now quite close together, there is an increased risk of co-channel interference, which will decrease the link quality and commensurately, the number of subscribers.

A number of techniques for combating co-channel interference have been proposed and implemented. These are generally specific to a particular multiple access scheme.

For example, with CDMA, the signals of all of the subscribers within a cell are sent by a base station transmitter in the downlink direction at the same time, so that each specific subscriber may decode its signal and cancel out the intra-cell interference. In the uplink direction, a subscriber's signal is typically scrambled by a long code with good correlation properties, so that the contribution of other subscribers to an individual subscriber's signal will more likely behave as white noise rather than significantly degrade single user detection.

In the case of FDMA systems, the total spectrum is divided into K subsets of frequencies and every cell uses one such subset. Rather than deploying the total spectrum for every cell in the network, a cluster of K cells will be repeated in the network, each being assigned one of the frequency subsets. Clearly, within a cluster, subscribers will not experience any co-channel interference.

For a frequency re-use factor K greater than one, co-channel cells, that is, cells assigned the same frequency subset, will not be adjacent to each other and thus, interference across the network should be minimized. Preferably, the frequency re-use factor is small in order to maximize the number of subscribers, as more frequencies may be allocated within a frequency subset.

Given the recent increase in the number of Base Station System (BSS) features introduced for use by base transceiver stations such as, power control, discontinuous transmission, fractional frequency loading and frequency hopping, an optimal frequency re-use factor may be K=3, with 100% frequency loading.

In any event, to further improve spectrum efficiency of cellular systems, a sectorization concept has been introduced in which an omni-directional antenna, traditionally placed in the centre of a cell, has been replaced by a plurality of N directional antennas, each defining a symmetrical coverage area. Thus, for the same area, the number of cells, and consequently, the number of subscribers within the network, has been increased by a factor of N.

The use of directional or sector antennas has thus further reduced the amount of interference in the network and has resulted in more spectrally efficient networks. A sector is symmetrical and generally wedge-shaped, with N sectors generally extending outward from the traditional centre of a cell. Each sector may now be considered a distinct cell, with its antenna extending from an extremity thereof.

Although, in theory, high spectral efficiency is achievable with large values of N, practical deployment considerations will generally limit this number to a finite set of possibilities. For example, large values of N will cause a significant proportion of the subscribers to languish in continuous handover situations. As well, a cell is generally identified to a subscriber through an identifying code, frequency channel, so that a subscriber may make continuous measurements to identify the best serving cell. With large values of N, a significant portion of the available bandwidth would be allocated to such control channels, without any significant increase in capacity. Consequently, typical values for N are 3, on rare occasions 4, and hardly ever exceeding 6.

When N=3, antennas with a half power beam width of 65° are typically used, because they provide better coverage. For uneven traffic between sectors or for other values of N, multiple antennas may be used with beam widths of 33, 45, 65, 90, 105, etc. For higher sectorization, that is, N>3, a mix of existing antennas will not provide optimal coverage, resulting in either a significant and excessive overlap between beam patterns or else high cusping loss between adjacent beam patterns. In the former case, an excessive number of subscribers will be candidates for handover, while in the latter scenario, coverage holes could result in handover failures.

Furthermore, it appears that the need for higher order sectorization is primarily a local phenomenon, rather than a characteristic across a network, since subscribers are not generally uniformly distributed across a network. As a result, the need for increased subscriber capacity is only apparent for a few scattered sectors in a network that typically encounter large distributions of subscribers.

In such a case, blindly increasing the number of sectors for all of the sites will not result in an efficient capacity to cost ratio since some of the additional transceivers will never be used.

A traditional means of increasing network capacity, known as cell splitting, is to reduce the coverage of existing cell sites and to introduce a new cell site in the newly created coverage holes. Cell splitting is very expensive for an operator, however, since new locations for the tower and equipment for the new site, such as high-rise buildings, have to be located and leased. In many dense urban environments, where increased network capacity would be beneficial, it is no longer possible to find suitable new site locations.

Therefore, alternative means of increasing network capacity are under investigation, such as deploying antennas with optimized beam patterns.

SUMMARY OF THE INVENTION

Accordingly, it is desirable to provide an antenna with beam patterns that are tailored for specific sector coverage.

It is further desirable to provide an antenna that can permit load balancing through the addition of capacity only where needed.

The present invention accomplishes these aims by replacing a single sector coverage area with at least one coverage area, at least one of which is asymmetrical. The use of asymmetrical coverage areas permits the total coverage area to closely approximate the symmetrical sector coverage area being replaced, without creating excessively large sub-sector handover zones or introducing severe degradation in the network performance.

According to a first broad aspect of an embodiment of the present invention, there is disclosed, a method for increasing subscriber capacity in a sectorized cellular communications network having a plurality of subscribers and a base station supporting at least one sector, the at least one sector having an associated sector antenna at the base station having a critical coverage area extending therefrom and overlapping neighbouring sectors thereof in a sector handover zone, the method comprising the step of: replacing the at least one sector antenna with a split-sector antenna having a plurality of sub-sector coverage areas extending therefrom, at least one of which is asymmetrical, each corresponding to a sub-sector and overlapping a neighbouring sub-sector coverage area in a sub-sector handover zone, whereby a total critical coverage area of the plurality of sub-sector coverage areas is substantially equivalent to the critical coverage area of the at least one sector antenna.

According to a second broad aspect of an embodiment of the present invention, there is disclosed a sub-sector antenna for use in a sectorized cellular communications network having a plurality of subscribers and a base station supporting at least one sector, the at least one sector having an associated sector antenna having a critical coverage area extending from the base station and overlapping neighbouring sectors in a sector handover zone, the sub-sector antenna being constructed and arranged for replacing the at least one sector antenna and having a plurality of sub-sector coverage areas extending therefrom, at least one of which is asymmetrical, each corresponding to a sub-sector and overlapping a neighbouring sub-sector coverage area in a sub-sector handover zone, whereby a total critical coverage area of the at least one asymmetrical sub-sector coverage area is substantially equivalent to the critical coverage area of the at least one sector antenna being replaced.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE PREFERRED EMBODIMENTS

In the present invention, rather than dealing with an increase in capacity by prior art mechanisms such as higher-order sectorization and/or cell splitting, an existing antenna is substituted with a new one, which has substantially the same coverage area as the fixed cell sector being replaced, but divided into a plurality of complementary asymmetrical separate beams or sub-sectors.

For exemplary purposes only, consider an existing antenna having a 65° half power beam width (HPBW). If an operator were to replace it with a new antenna, it would be advantageous to have the new antenna provide the same coverage (albeit with increased capacity) as the existing antenna, so that the operator may avoid significant network planning and adjustment of neighbouring sites. Accordingly, it would be beneficial to provide the new antenna with a beam pattern that is as close as possible to the critical coverage area (CCA) of the existing antenna, so as to provide minimal network planning. In the case of a 65° HPBW antenna, this is typically 120°.

Where, as with the present invention, the new antenna may produce a plurality of separate beams, each defining a new sub-sector with only a small overlapping area between them and which together provide substantially identical coverage to the sector supported by the original antenna, a single sector may be upgraded to become a plurality of sub-sectors without significantly affecting neighbouring sites.

It has been discovered that such new antennas may be created by introducing asymmetry into the generated beam pattern.

Figure 1:
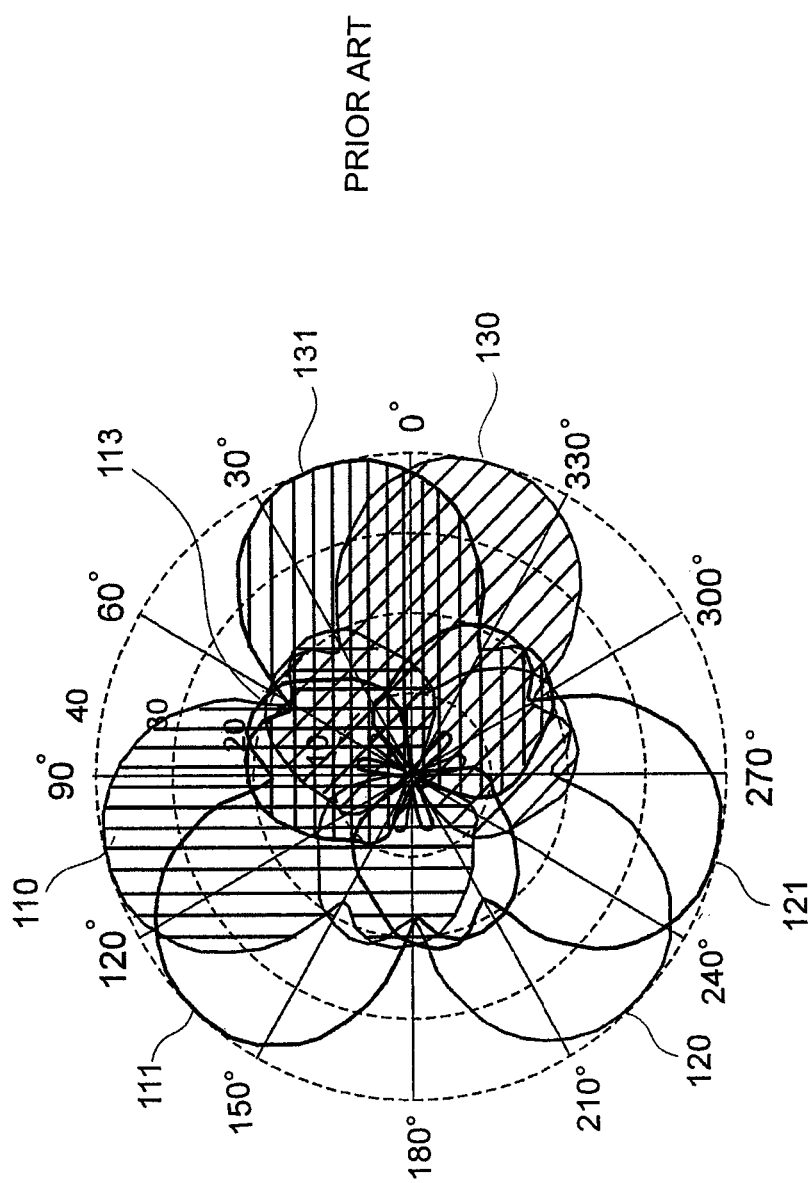
FIG. 1 is a polar plot of a plurality of pairs of symmetrical sub-sector beams.

Heretofore, antenna beam patterns have consistently been symmetrical, such as is shown in FIG. 1, which shows 3 mirror-imaged pairs (110,111), (120,121) (130,131) of symmetrical sub-sector beams. Such a coverage pattern creates very large overlap regions between pairs of sub-sector beams (e.g. 130, 131), and between a sub-sector beam from two different adjacent sectors, e.g. 131, 110 (at 113).

However, if the symmetrical beam patterns were adjusted in order to ensure substantially the same roll-off at the extremities so as to provide substantially similar handover treatment from the sub-sectors defined by the new antenna to adjacent unmodified sectors and vice versa, the new beams would introduce excessive overlap as between themselves. On the other hand, adjusting the beam patterns for the new sub-sectors so that the handover between sub-sectors is manageable could result in coverage holes with existing sectors.

Figure 2:
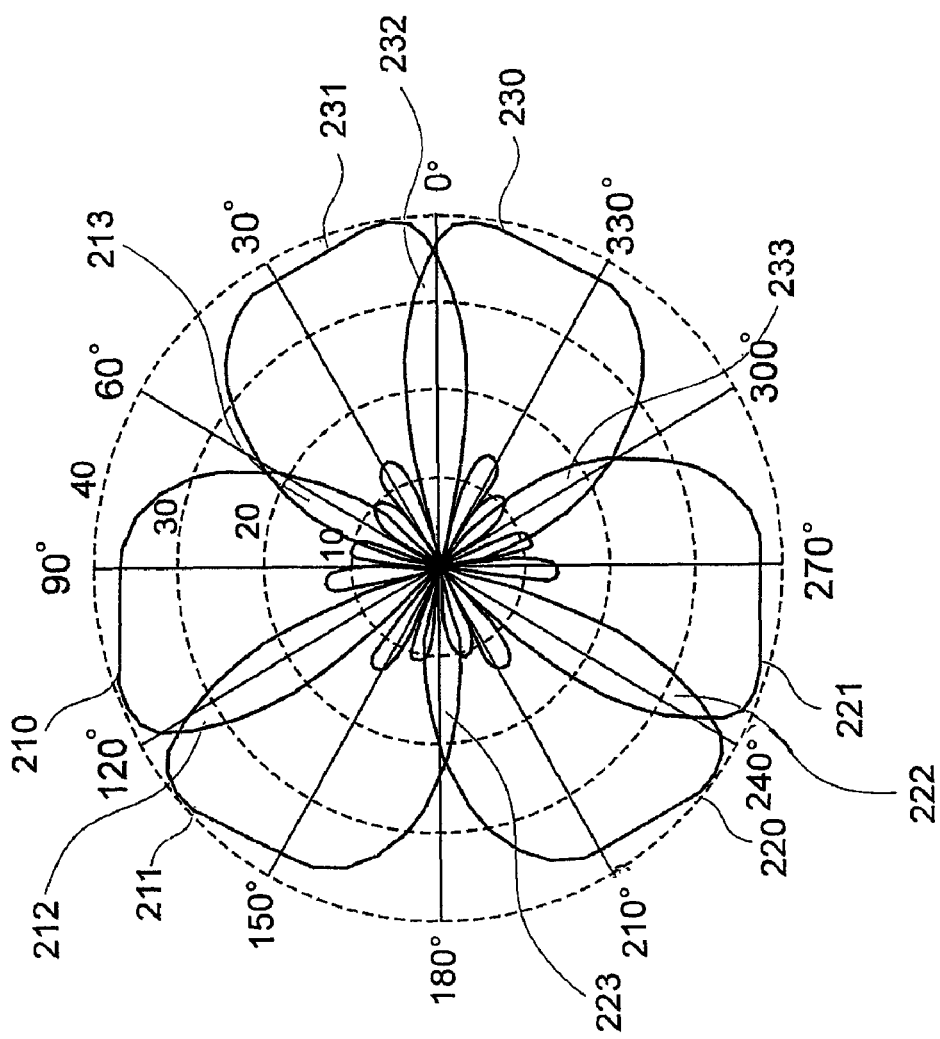
FIG. 2 is a polar plot of a mirror-imaged pair of asymmetrical sub-sector beams according to an embodiment of the present invention.
Figure 3:
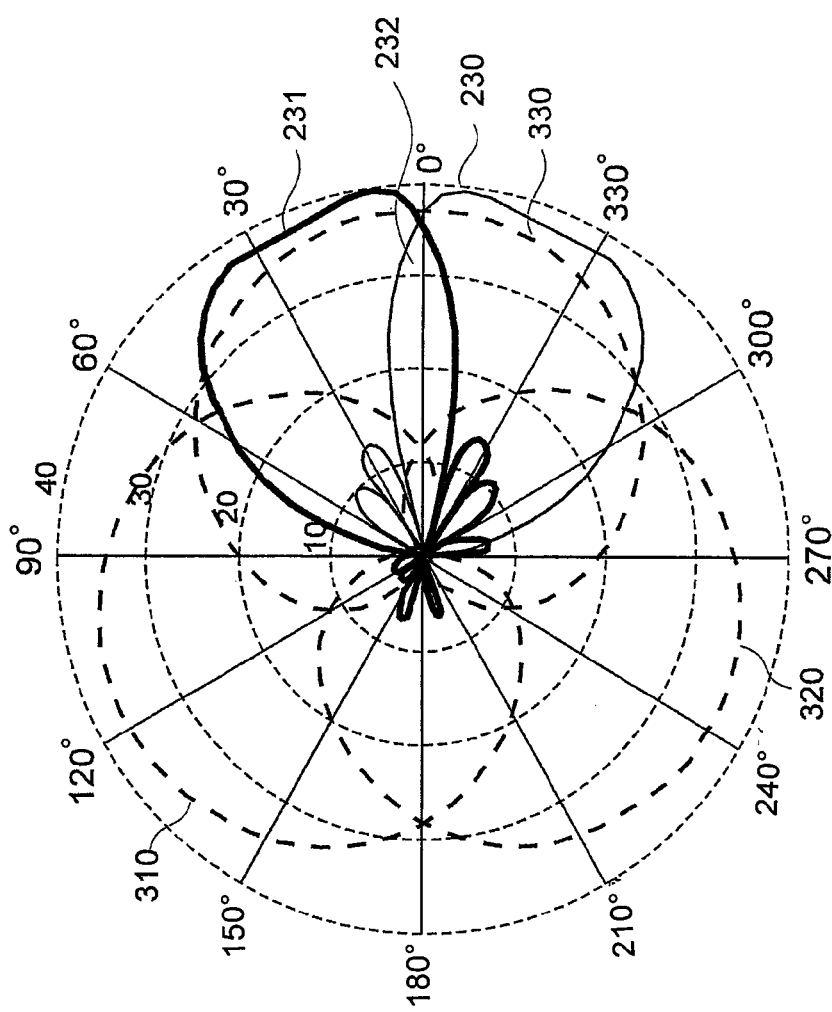
FIG. 3 is a polar plot showing a single pair of asymmetrical sub-sector beams overlaying a conventional tri-sector cellular coverage region.

As can be seen from a comparison of FIG. 2, which shows 3 mirror-imaged pairs (210, 211), (220,221), (230,231) of asymmetrical sub-sector beams to replace a traditional 3 sector configuration with a 6 sub-sector configuration, the use of asymmetrical beams ensures handover region reduction by means of the low overlap 212 of adjacent pairs of sub-sector beams 210, 211 and between sub-sector beam 211 of a first pair and a sub-sector beam 220, of a second pair, shown at 223. This consequently reduces handover overhead for most wireless standards and results in a net capacity and throughput increase, while maintaining the initial coverage by matching the antenna radiation pattern at the edges of the original sector, so that network planning overhead is minimized or avoided. Furthermore, the use of an asymmetrical sub-sector beam maintains low cusping loss between adjacent beams so as to achieve good overall network coverage with no new coverage holes. This is shown in FIG. 3 which shows, for clarity of illustration, sub-sector beams 230, 231, overlaying conventional full sector beam patterns 310, 320, 330 shown in dashed outline.

For ease in use, clarity and maximum versatility, radiation plots are usually normalized to the outer edge of the coordinate system. Furthermore, signal strength is not normally thought of in terms of strength in volts, microvolts etc., so radiation plots are usually shown in relative decibels (dB).

Decibels are used to express differences in power in a logarithmic fashion. A drop of 1 dB means that the power is decreased to about 80% of the original value while a 3 dB drop is a power decrease of 50% or one-half the power. The beamwidth specified on most data sheets is usually the 3 dB or half-power beamwidth. A 10 dB drop is considered a large drop, a decrease to 10% of the original power level.

Figure 4:
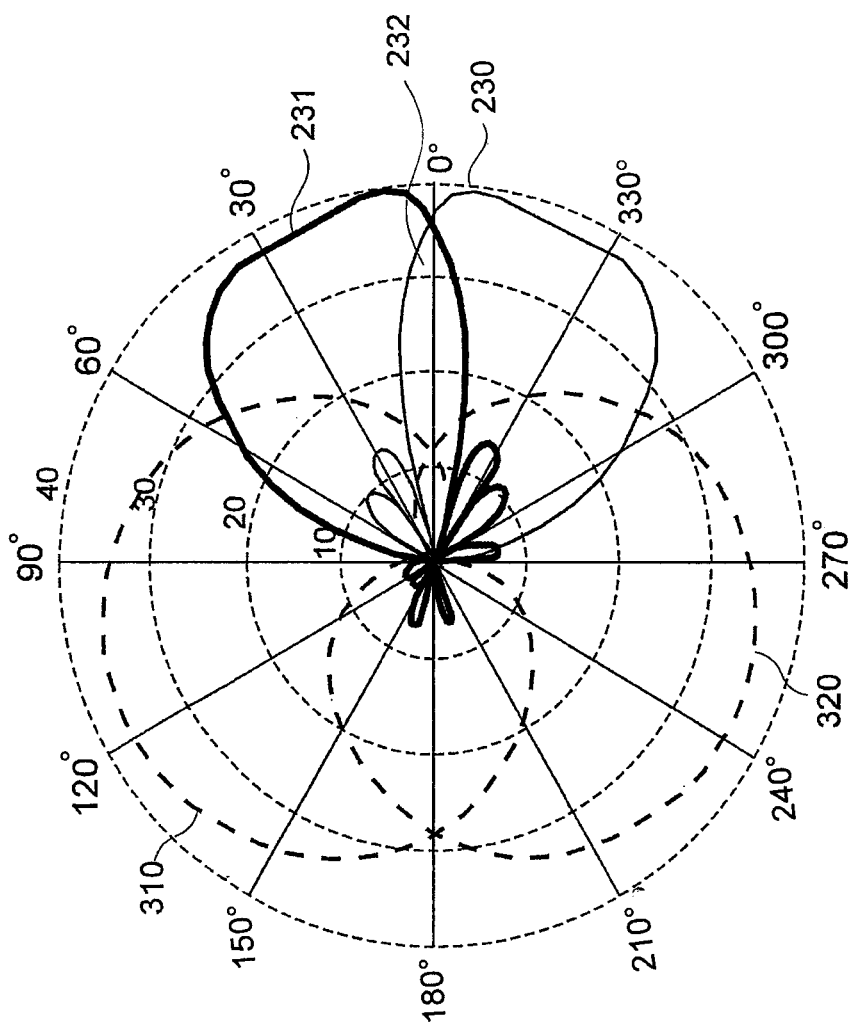
FIG. 4 is a polar plot of a mirror imaged pair of asymmetrical sub-sector beams according to an embodiment of the present invention, together with two conventional sector beams.
Figure 5:
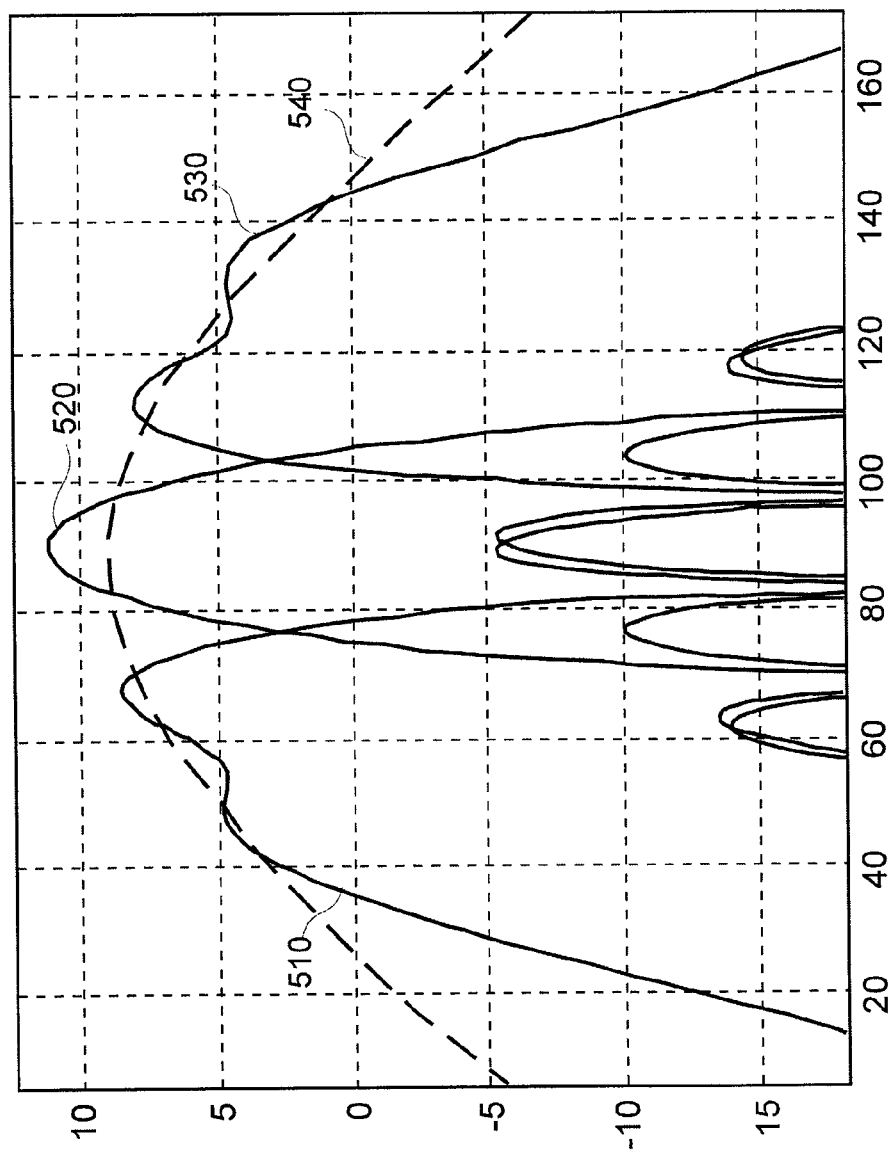
FIG. 5 is a cartesian plot of a tri sub-section beam pattern overlaying a conventional sector beam pattern according to an embodiment of the present invention.

Those having ordinary skill in this art will readily recognize that not all sectors need to be upgraded, as is shown in FIG. 4. Nor are all sectors upgraded to the same sectorization level. Rather, some sectors 310, 320 could be left alone, without upgrade, while others (230, 231) upgraded to be replaced by a two sub-sector configuration. Still others could be replaced by a higher sub-sector configuration as shown in FIG. 5, which shows a 3 sub-sector configuration 510, 520, 530. In order to provide substantially similar coverage over the conventional sector beam 540 they are replacing (shown in dashed outline), the central sub-sector beam 520 may be symmetrical, while the other two sub-sector beams 510, 530 are asymmetrical and mirror images of one another.

Figure 6:
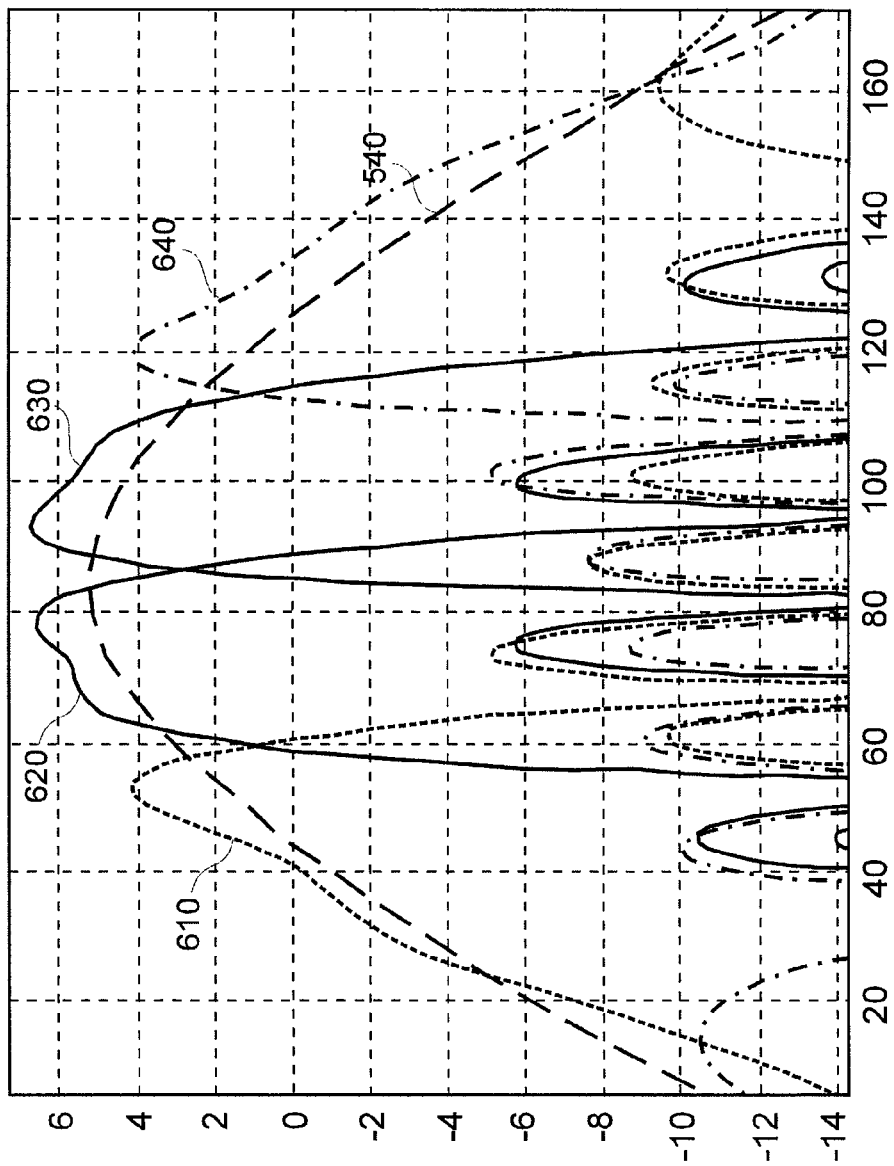
FIG. 6 is a cartesian plot of a quad sub-sector beam patter overlaying a conventional sector beam pattern, according to an embodiment of the present invention.

In FIG. 6, there is shown a 4 sub-sector configuration 610, 620, 630, 640. Again, the conventional sector beam 540 is shown in dotted outline. Here however, the two central sub-sector beams 620, 630 are asymmetrical and mirror images of one another, as are the two outer sub-sector beams 610, 640.

In both FIGS. 5 and 6, it may be seen that the introduction of asymmetrical beams allows close approximation of the coverage area of the conventional sector antenna being replaced, with small side lobes and minimal overlap. Because the beam patterns of the new antenna corresponding to a sector to sub-sector upgrade have largely the same overall beam pattern as the antenna being replaced, as shown in FIG. 3, upgrades could be made relatively transparently with regard to network planning, resulting in more efficient use of resources.

In the design of the inventive asymmetrical radiation patterns, preferably, the side lobe levels are reduced. This reduces the amount of unwanted transmitted power to other sectors in the network, which contributes to interference. The resulting interference reduction translates into increased network capacity. Furthermore, reduced side lobe levels permit frequency re-use in adjacent sectors. If small sub-sector overlap and side lobe levels can be achieved, the possibility of co-channel interference would be substantially eliminated, permitting frequencies to be re-used in adjacent sectors and consequently increasing the network capacity through an increase in the number of subscribers.

Each sub-sector may be treated as an individual cell, so that the subscriber would identify the best serving sub-sector by means of measurements, using, for example in the CDMA protocol, a differentiating code or a narrowband frequency specified by the applicable wireless standard.

Alternatively, the asymmetrical beams of the present invention may be used for adaptive beam forming applications wherein a specific subscriber is tracked by the best-serving beam. In such a case, the old antenna may continue to be used for the broadcast of control information while the new antenna is used for traffic channels dedicated to specific subscribers. Once the means of broadcasting control information is capable of being taken up by the new antenna, the old antenna may thereafter be removed entirely. Such capability might include using one column of the antenna array for broadcast of control information. Alternatively, all of the beams could be tasked with transmitting and receiving control information.

In a preferred embodiment, the asymmetrical beams are implemented using antenna arrays in conjunction with passive and/or active networks. However, those having ordinary skill in this art will recognize that it is possible to implement the inventive asymmetrical beam patterns without resort to antenna arrays.

Figure 7:
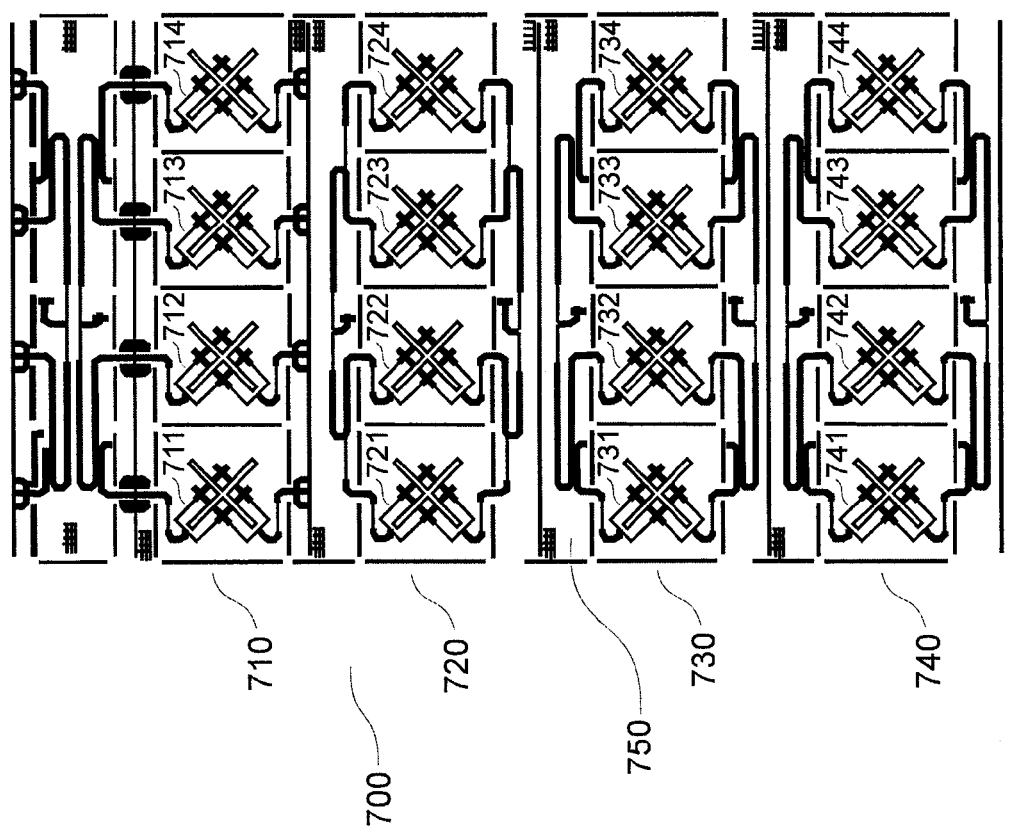
FIG. 7 is an artwork layout of an exemplary sector antenna system in accordance with an embodiment of the present invention.

FIG. 7 shows an exemplary implementation of an antenna array system, shown generally at 700, that could generate the sub-sector beam pair 230, 231. The array 700 comprises a 4×4 planar array of cross-polarized antenna elements 711-714, 721-724, 731-734, 741-744, such as is well known to those having ordinary skill in this art. Each polarization for each element in each row 710, 720, 730, 740 of the array, for example, row 730 comprising elements 731-734, are combined together by means of a beamforming network 750, which is shown in greater detail in FIG. 8.

In receive mode, the beamforming network 750 combines the signals received at each of ports 1 through 4 851-854, at port 5 855. In transmit mode, the signal at port 5 855 is split and rotated in phase before it is distributed to each of ports 1 through 4 851-854, which in turn drive antenna elements 731-734.

Figure 8:
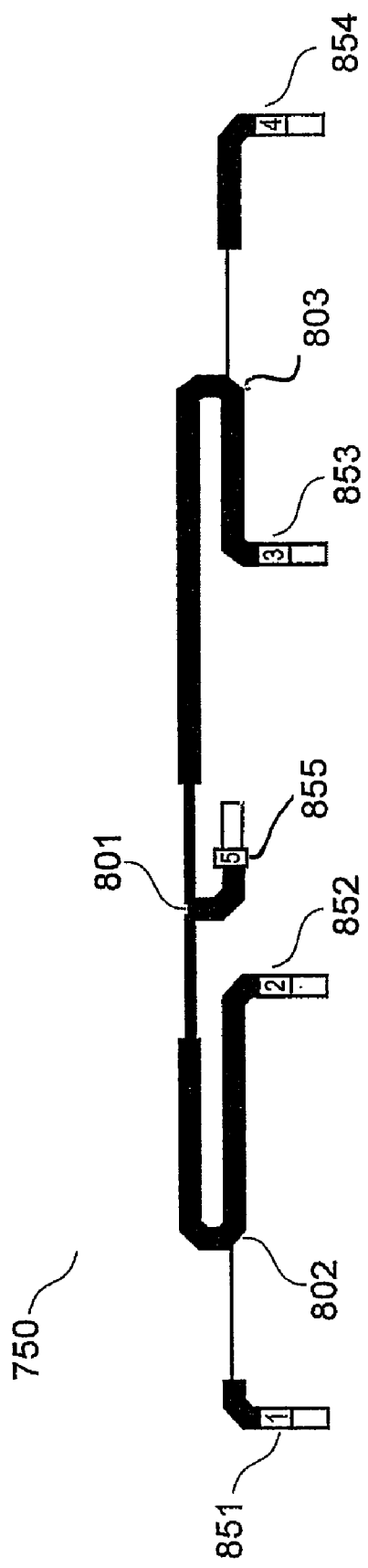
FIG. 8 is an artwork layout of an exemplary beamforming network sector for the sector antenna system for FIG. 7.

The proportions into which the power is split are inversely proportional to the relative widths of the conductive traces at each of the splitter junctions 801, 802, 803. In the embodiment of FIG. 8, the powers at each of ports 1 through 4 851-854 are, by way of example only, in units mW relative to 1 mW at port 5 855: 0.02, 0.4178, 0.4178 and 0.082 respectively.

Furthermore, the relative phase rotations are determined by the relative lengths of each of the conductive traces corresponding to each of the ports. In the embodiment of FIG. 8, the signal at port 5 855 is rotated by 98.3, 36.4, −36.4 and −98.3 degrees before it arrives at ports 1 through 4 851-854 respectively, again by way of example only.

Those having ordinary skill in this art will appreciate that there are a number of mechanisms by which a series of powers and phase coefficients could be generated to match a specified antenna pattern, including but not limited to array synthesis methods, solving constrained optimization problems or even by trial and error. In this instance, a simulation tool, such as is available from Zeland Software Inc. was used to predict the asymmetrical antenna array patterns and the expected array performance obtainable therefrom.

While, with the inventive asymmetrical beam patterns, network planning could be reduced, it may not necessarily be eradicated altogether. Those having ordinary skill in this art will readily recognize that when a single site is subject to higher order sectorization as contemplated by the present invention, design techniques may be used to further reduce network planning. For example, alternating or adjacent beams may use common control frequency and/or code resources. With the excellent front-to-back ratio of modern antennas, there would be minimal co-channel interference between sectors and with the alternating beam approach described, the need for extra control channels or code offsets could be dispensed with, resulting in better spectrum efficiency. For example, in FIG. 2, sub-sector beams 210 and 221 could be commonly controlled with minimal loss of performance.

Furthermore, when multiple sites are subject to higher order sectorization in a specific area, automatic frequency planning could be used to derive an optimal frequency plan for all the sites. For CDMA systems, by way of example, this would mean that optimal long codes or code offsets would be identified. Because the asymmetrical beams of the present invention do not radiate excessively in unwanted directions, less network interference will be experienced. As well, because individual beams in the higher order sectorization sites are narrower than the original coverage, the interference of a specific broadcast frequency or code will be substantially reduced. Depending upon the network topology and the distribution of the sites subject to higher order sectorization, the consequential improvement in signal to interference ratios for the control channels will largely dispense with the need for extra control frequencies or codes. In the limiting case of 100% deployment of higher order sectorization in the network, the above-described alternation or opposition scheme could be applied so that additional broadcast channels or codes could be dispensed with.

Figure 9:
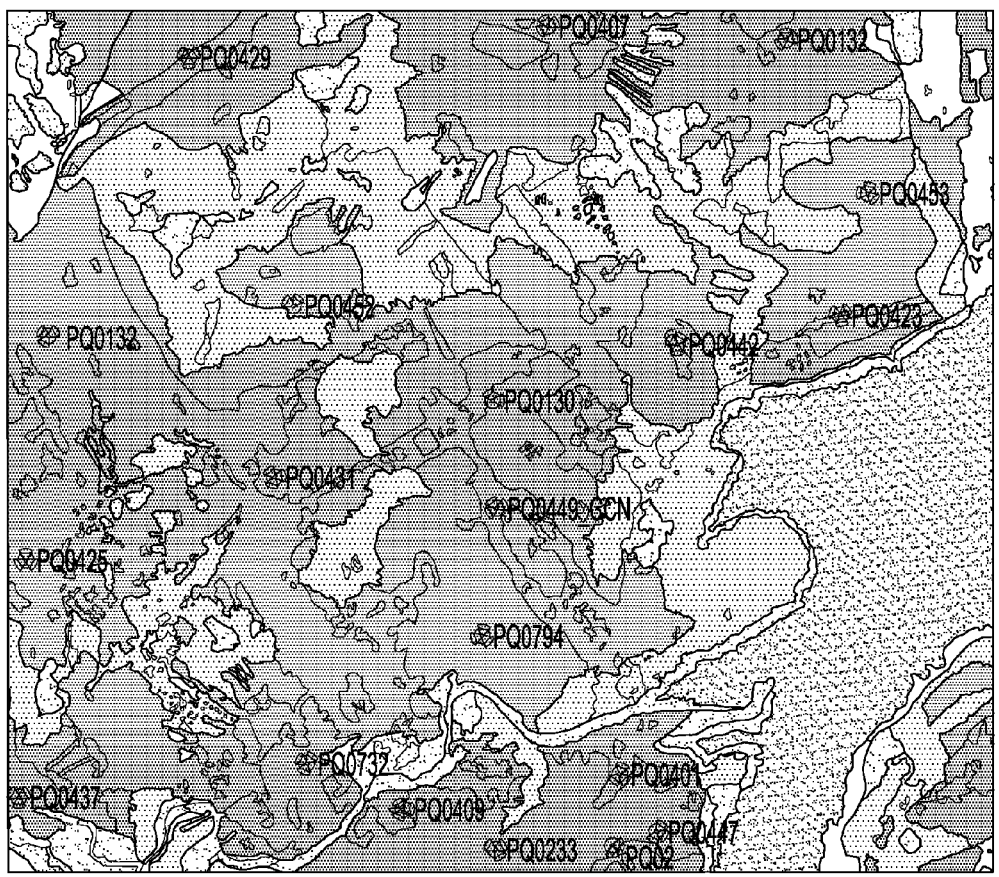
FIG. 9 is a geographic representation of a real tri-cellular network.
Figure 10:
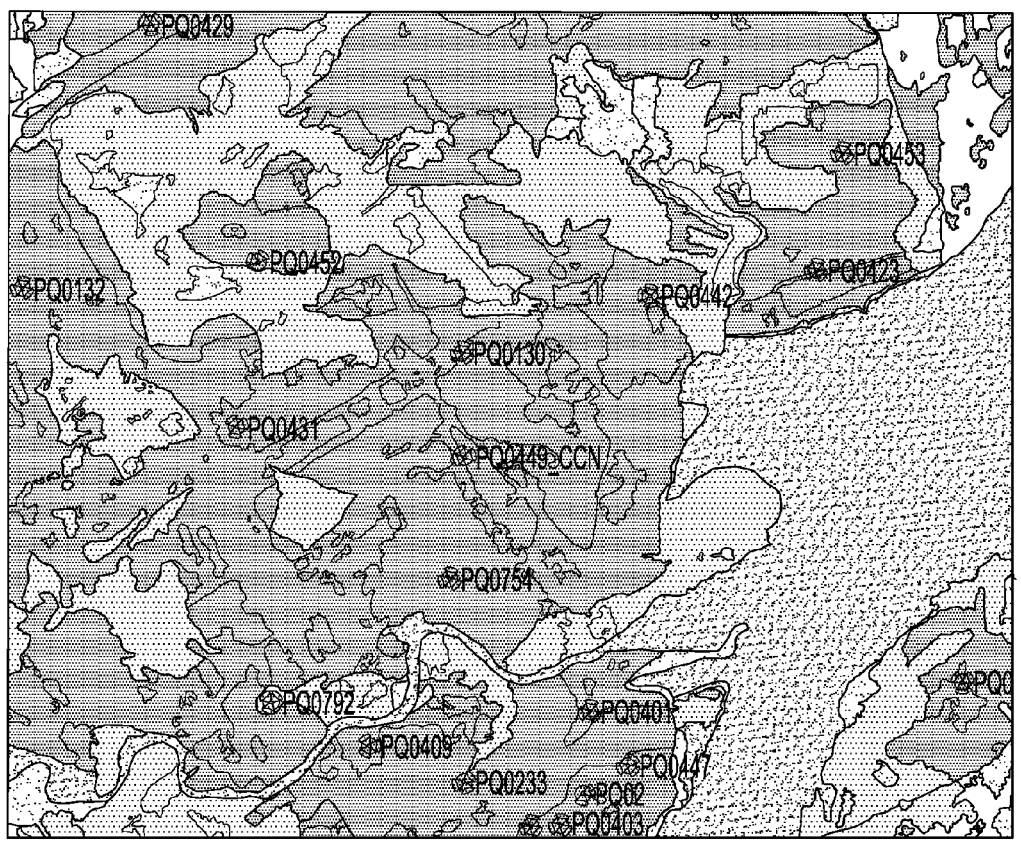
FIG. 10 is a geographic representation of a real tri-cellular network in which a single cellular site is equipped with a bi-sector array of the present invention.

FIG. 9 shows a geographic representation of a real tri-cellular network with several cellular sites, each equipped with three 65 degree half power beamwidth antennas. FIG. 10 shows a geographic representation of the same real tri-cellular network of FIG. 9, in which only one sector of site PQ0130 was upgraded with a bi-sector array (BSA) of the present invention. Although this BSA antenna inherited the same pointing direction and down tilt value of the original antenna, a large improvement in network coverage could be seen in comparing the results shown in FIG. 9 compared to FIG. 10. The shading in FIGS. 9 and 10 represent the received signal level by terminals that are higher than the prescribed threshold in dBm. Collected Busy Hour Traffic data for all the sectors in the network as well as the network parameters (antenna radiation patterns for all the sectors, their pointing directions and tilting values, output power of base stations, RF cable losses, number of CDMA carriers per sector) were provided by a service provider to enhance the simulation accuracy and also predict the capacity gains from the BSA before field trials. Furthermore, terrain data was provided so that more accurate channel modelling could be done by a network planning tool. The network planning tool used for this simulation was ATOLL, developed by FORSK company.

The first step in the simulation was to provide all the data, mentioned above, to the network planning tool and run for several iterations; i.e. Monte Carlo simulations were performed, to gather reliable statistics of the tri-cellular network prior to running the simulation with the upgraded PQ0130 site with a BSA. Table 1 shows the output metrics from the network planning tool.

TABLE 1

Network statistics at sector, cluster and site level before and after upgrading one sector of site PQ 0130.

|  | Sector | | | Site | | | Cluster | | |
| --- | --- | --- | --- | --- | --- | --- | --- | --- | --- |
|  | Before | After | Improvement | Before | After | Improvement | Before | After | Improvement |
| NMAX | 173.86 | 392.10 | 125.5% | 350.54 | 554.73 | 58.3% | 7,312.25 | 7,232.91 | 1.1% |
| Connection Success rate | 42.14 | 56.44 | 33.9% | 54.68 | 54.68 | 0.0% | 61.69 | 60.27 | 2.3% |
| Handover Overhead | 1.54 | 1.39 | 9.2% | 1.49 | 1.42 | 4.8% | 1.55 | 1.58 | 1.7% |
| Coverage (sq km) | 1.68 | 2.51 | 49.4% | 3.25 | 4.14 | 27.2% | 60.22 | 60.07 | −0.2% |
| Average Rx NR to traffic ratio | 0.04 | 0.05 | −18.9% | 0.04 | 0.05 | −11.5% | 0.04 | 0.04 | −0.3% |

Table 1 above shows the statistics for the baseline network and after upgrading one sector of PQ0130 with a bi-sector array with asymmetrical beams. The number of transceivers in the upgraded sector were doubled and therefore its capacity was expected to double. Apart from the upgraded sector, the statistics were collected for the site and also for the cluster of surrounding sites. The main simulation results are summarized as follows:

(1) The capacity of the upgraded sector increased by 125% whereas an increase of only 100% was expected;
(2) The capacity of PQ0130 site increased by 58%;
(3) Handover overhead for the upgraded sector and site PQ0130 improved by 9% and 4.8% respectively;
(4) Coverage of the upgraded sector and site PQ0130 improved by 49% and 27% respectively;
(5) The area of the overall network with signal level greater than −80 dBm increased by 21% (see Table 2 below);
(6) At the cluster level, there is no degradation in terms of key performance metrics;
(7) A degradation of reverse link noise rise occurred at each of sector and site level by 18.9% and 11.5% respectively.

From the above simulation results, it is apparent that upgrading a single sector by asymmetrical beams may add benefits to surrounding sectors in the network and without any significant degradation to surrounding sectors and sites.

The effect of simulation on the network coverage density, shown in terms of coverage by signal level is set out in Table 2 below.

TABLE 2

Effects on Network Coverage Density

| Network Coverage Density Coverage by Signal Level | Surface (km$^2$) Before | Surface (km$^2$) After | Improvement |
|---|---|---|---|
| Best signal level (dBm) >= −80 | 72.72 | 88.05 | 21.1% |
| Best signal level (dBm) >= −90 | 99.46 | 99.62 | 0.2% |
| Best signal level (dBm) >= −100 | 101.40 | 101.52 | 0.1% |
| Best signal level (dBm) >= −110 | 101.66 | 101.63 | 0.0% |
| Best signal level (dBm) >= −120 | 101.75 | 101.74 | 0.0% |

The present invention can be implemented in digital electronic circuitry, or in computer hardware, firmware, software, or in combination thereof. Apparatus of the invention can be implemented in a computer program product tangibly embodied in a machine-readable storage device for execution by a programmable processor; and actions can be performed by a programmable processor executing a program of instructions to perform functions of the invention by operating on input data and generating output. The invention can be implemented advantageously in one or more computer programs that are executable on a programmable system including at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and specific microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of volatile and non-volatile memory, including by way of example semiconductor memory devices, such as EPROM, EEPROM, and flash memory devices; magnetic disks such as internal hard disks and removable disks; magneto-optical disks; CD-ROM disks; and buffer circuits such as latches and/or flip flops. Any of the foregoing can be supplemented by, or incorporated in ASICs (application-specific integrated circuits), FPGAs (field-programmable gate arrays) or DSPs (digital signal processors).

The system may comprise a processor, a random access memory, a hard drive controller, and an input/output controller coupled by a processor bus.

It will be apparent to those skilled in this art that various modifications and variations may be made to the embodiments disclosed herein, consistent with the present invention, without departing from the spirit and scope of the present invention.

Other embodiments consistent with the present invention will become apparent from consideration of the specification and the practice of the invention disclosed therein.

Accordingly, the specification and the embodiments are to be considered exemplary only, with a true scope and spirit of the invention being disclosed by the following claims.

The embodiments of the present invention for which an exclusive property or privilege is claimed are:

1. A method for increasing subscriber capacity in a sectorized cellular communications network having a plurality of subscribers and a base station supporting at least one sector, each of the at least one sector having one or more associated sector antennae at the base station having a critical coverage area extending therefrom and overlapping neighbouring sectors thereof in a sector handover zone, the method comprising a step of: replacing the associated one or more sector antennae for a given sector with a split-sector antenna having a plurality of sub-sector coverage areas extending therefrom, at least one of which is asymmetrical, each corresponding to a sub-sector and overlapping a neighbouring sub-sector coverage area in a sub-sector handover zone, whereby a total critical coverage area provided by the plurality of sub-sector coverage areas is substantially equivalent to a critical coverage area of the replaced one or more associated sector antennae, wherein said at least one asymmetrical sub-sector coverage area reduces overlap with said neighbouring sub-sector coverage area comparing to overlap of the replaced antennae while maintaining the critical coverage area of the replaced antenna.

2. The method according to claim 1, further comprising a step of allocating different control resources to neighbouring sub-sector coverage areas.

3. The method according to claim 1, further comprising a step of allocating a common control resource to a pair of sub-sector coverage areas, each neighbouring a third sub-sector coverage area having a different allocated control resource.

4. The method according to claim 1, further comprising a step of allocating to the replaced one or more sector antennae a task of broadcasting control information.

5. The method according to claim 1, further comprising a step of transferring a task of broadcasting control information from the replaced one or more sector antennae to the split-sector antenna, and of removing the replaced one or more sector antennae.

6. The method according to claim 1, further comprising a step of allocating to the split-sector antenna a task of handling traffic from at least one of the subscribers.

7. The method according to claim 1, wherein the plurality of sub-sector coverage areas comprise a multiple of 2 asymmetrical sub-sector coverage areas.

8. The method according to claim 7, wherein the plurality of sub-sector coverage areas further comprise a symmetrical central sub-sector coverage area.

9. The method according to claim 1, wherein the plurality of sub-sector coverage areas comprise two sub-sector coverage areas, each one of which having a half power beam width of about half that of the critical coverage area of the replaced one or more associated sector antennae.

10. The method according to claim 9, wherein the critical coverage area of the replaced one or more associated sector antennae has a half power beam width selected from a group consisting of: approximately 65°, 90°, 105° and 120°.

11. The method of claim 1, wherein said at least one asymmetrical sub-sector coverage area has smaller overlapping area in the sub-sector handover zone with respect to an adjacent sub-sector in the plurality of sub-sector coverage areas, than overlapping areas that exist between a pair of symmetrical sectors.

12. The method of claim 1, wherein the said split-sector antenna is configured to project its beam pattern for said asymmetrical sub-sector coverage area such that the total critical coverage area provided by the plurality of sub-sector coverage areas is substantially equivalent to the critical coverage area of the replaced one or more associated sector antennae.

13. A split-sector antenna for use in a sectorized cellular communications network having a plurality of subscribers and a base station supporting at least one sector, each of the at least one sector having one or more associated sector antennae at the base station having a critical coverage area extending therefrom and overlapping neighbouring sectors in a sector handover zone, the split-sector antenna being constructed and arranged for replacing the one or more associated sector antennae and having a plurality of sub-sector coverage areas extending therefrom, at least one of which is asymmetrical, each corresponding to a sub-sector and overlapping a neighbouring sub-sector coverage area in a sub-sector handover zone, whereby a total critical coverage area provided by the plurality of sub-sector coverage areas is substantially equivalent to a critical coverage area of the replaced one or more associated sector antennae, wherein said at least one asymmetrical sub-sector coverage area reduces overlap with said neighbouring sub-sector coverage area comparing to overlap of the replaced antennae while maintaining the critical coverage area of the replaced antenna.

14. The split-sector antenna according to claim 13, wherein the plurality of sub-sector coverage areas comprise a multiple of 2 asymmetrical sub-sector coverage areas.

15. The split-sector antenna according to claim 14, wherein the multiple of 2 asymmetrical sub-sector coverage areas comprise one or more pairs of same, a first area of a given pair being substantially a mirror image of a second area of the given pair.

16. The split-sector antenna according to claim 14, wherein the plurality of sub-sector coverage areas further comprise a symmetrical central sub-sector coverage area.

17. The split-sector antenna according to claim 13, wherein the split-sector antenna generates minimal side lobes associated with each asymmetrical sub-sector coverage area.

18. The split-sector antenna according to claim 13, wherein the plurality of sub-sector coverage areas comprise two sub-sector areas, each one of which having a half power beam width of about half that of the critical coverage area of the one or more associated sector antennae being replaced.

19. The split-sector antenna according to claim 13, wherein the sub-sector handover zone is substantially equal to the sector handover zone.

20. A sectorized cellular communications network having a plurality of subscribers, comprising: one or more base stations each supporting at least one sector; and one or more sector antenna associated with each of the at least one sector providing a critical coverage area extending therefrom and overlapping neighbouring sectors in a sector handover zone, wherein at least one sector antenna is replaced with a split-sector antenna having a plurality of sub-sector coverage areas extending therefrom, at least one of which is asymmetrical, each corresponding to a sub-sector and overlapping a neighbouring sub-sector coverage area in a sub-sector handover zone, whereby a total critical coverage area provided by the plurality of sub-sector coverage areas is substantially equivalent to a critical coverage area of the replaced one or more associated sector antennae, wherein said at least one asymmetrical sub-sector coverage area reduces overlap with said neighbouring sub-sector coverage area comparing to overlap of the replaced antennae while maintaining the critical coverage area of the replaced antenna.

21. The network according to claim 20, wherein the plurality of sub-sector coverage areas comprise a multiple of 2 asymmetrical sub-sector coverage areas.

22. The network according to claim 21, wherein the multiple of 2 asymmetrical sub-sector coverage areas comprise one or more pairs of same, a first area of a given pair being substantially a mirror image of a second area of the given pair.

23. The network according to claim 21, wherein the plurality of sub-sector coverage areas further comprises a symmetrical central sub-sector coverage area.

24. The network according to claim 20, wherein the sub-sector handover zone is substantially equal to the sector handover zone.

25. The network according to claim 20, wherein the split-sector antenna generates minimal side lobes associated with each asymmetrical sub-sector coverage area.

26. The network according to claim 20, further comprising a passive network for implementing the at least one asymmetrical sub-sector coverage area.

27. The network according to claim 20, further comprising an active network for implementing the at least one asymmetrical sub-sector coverage area.

28. The network according to claim 20, wherein the split-sector antenna generates two asymmetrical coverage areas each having a half power beam selected from a the group consisting of: approximately 33°, 45°, 53° and 60°.

* * * * *